No. 795,615. PATENTED JULY 25, 1905.
S. E. HUFFMAN.
ANIMAL TRAP.
APPLICATION FILED APR. 21, 1905.

2 SHEETS—SHEET 1.

No. 795,615. PATENTED JULY 25, 1905.
S. E. HUFFMAN.
ANIMAL TRAP.
APPLICATION FILED APR. 21, 1905.

2 SHEETS—SHEET 2.

Inventor
Simeon E. Huffman

Witnesses

UNITED STATES PATENT OFFICE.

SIMEON E. HUFFMAN, OF ARCANUM, OHIO.

ANIMAL-TRAP.

No. 795,615.          Specification of Letters Patent.          Patented July 25, 1905.

Application filed April 21, 1905. Serial No. 256,717.

*To all whom it may concern:*

Be it known that I, SIMEON E. HUFFMAN, a citizen of the United States, residing at Arcanum, in the county of Darke and State of Ohio, have invented certain new and useful Improvements in Animal-Traps, of which the following is a specification.

My invention relates to improvements in animal-traps, and which while specially desirable for catching mice may be used for other animals; and the object of my invention is the provision of a trap which is always set to trap the animal and from which it is impossible for the animal to escape, which will have a large receiving capacity and in a short period of time effect the trapping of a large number of mice or other animals, and which will be of simple, inexpensive, and durable construction to render the trap useful and practical.

With these objects in view my invention consists of an animal-trap embodying novel features of construction and combination of parts, substantially as disclosed herein.

Figure 1:
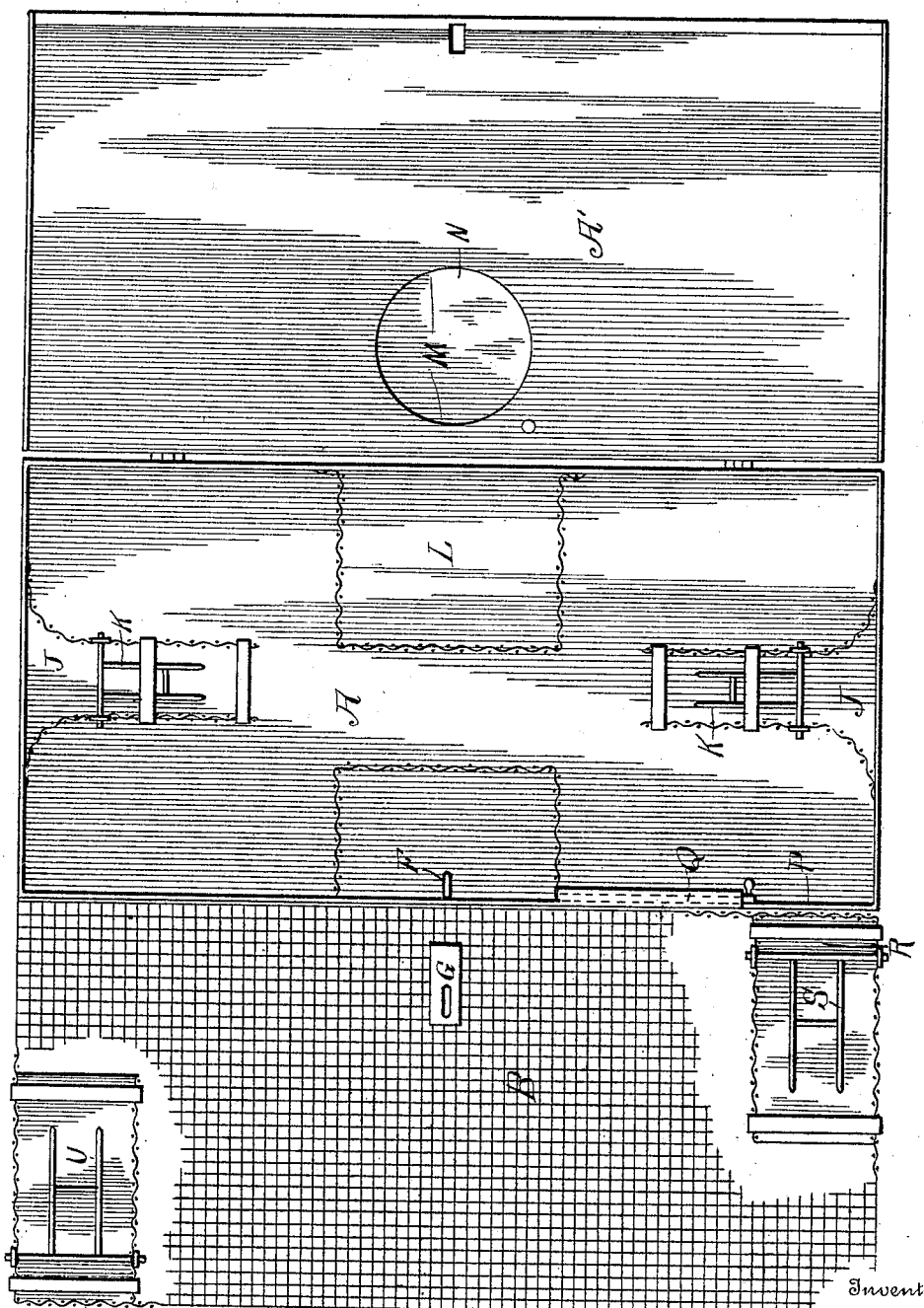
Figure 2:
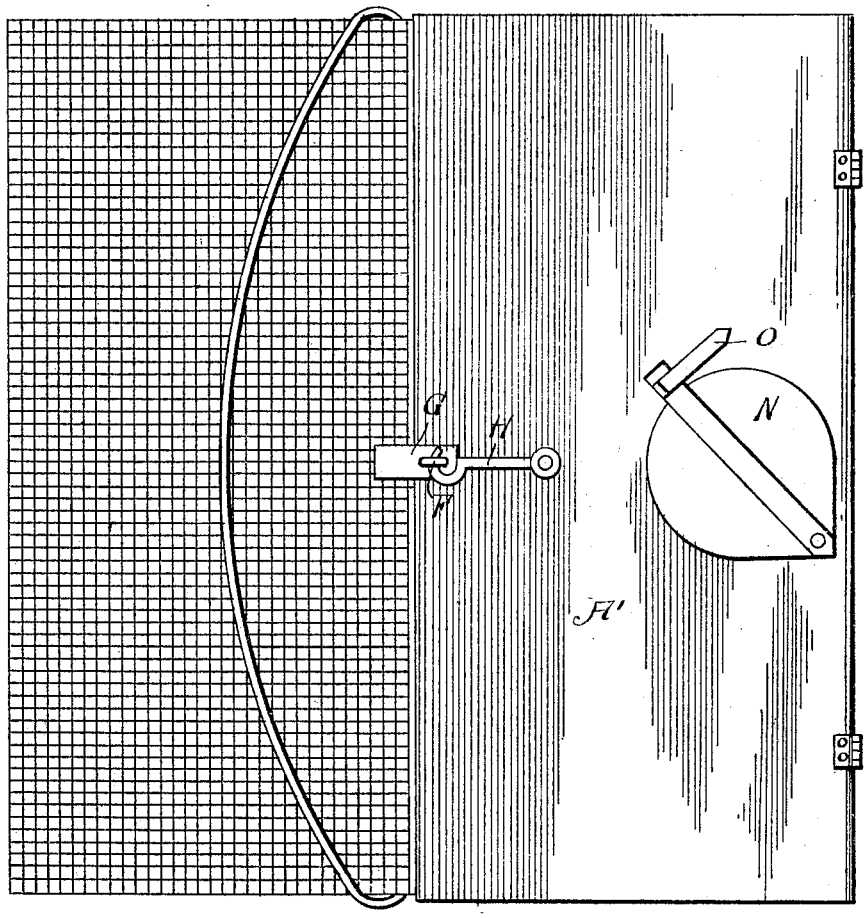
Figure 3:
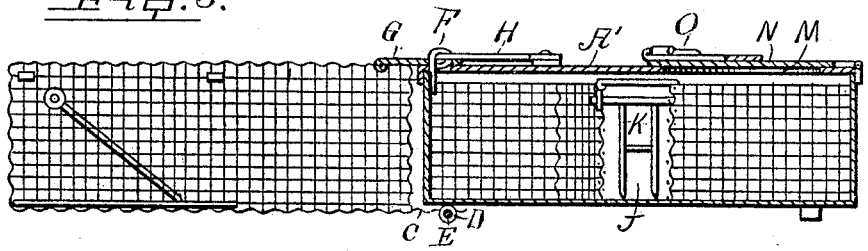

Figure 1 represents a top plan view of the trap with the lid or cover of one of the sections thrown back or open to show the interior construction. Fig. 2 is a top plan view with the lid or cover closed, and Fig. 3 is a cross or transverse sectional view of the complete trap.

The trap consists of the section or compartment A, in which the mice or other animals enter or are received, and the trapping or containing section or compartment B, which is preferably composed or made of wire in the form of a screen, which will permit the mice from the outside to see the mice in this compartment, and thus serve to entice the mice into said compartment, and this compartment is provided with a flap or extension C at its inner lower corner formed with eyes D on section A, which eyes receive the rod or pintle E for connecting the two sections, and the section A is provided with a cover A', which is formed near its inner edge with a staple F, with which engages the slot of the hinged plate G, and a catch H engages the staple, and thus connects the sections A and B together, but permits the ready detachment or removal of the section B when desired to destroy the mice or animals by drowning or otherwise.

The section or compartment A is provided at opposite ends with a door or entrance J, provided each with a pivoted or gravity door K, and with bait-receiving inclosures L, one of the inclosures alining with an opening M in the cover, which opening has the pivoted lid N, which when closed is secured by the keeper O. The section A is also provided with the opening P, which may be closed by the sliding door Q, and this opening registers or alines with the entrance R to the compartment B, said entrance having a pivoted or gravity door S, and the compartment B is further provided with the entrance or inlet T, permitting the mice or animals to enter and be trapped in said compartment, and a gravity or pivoted door U is provided for this compartment.

From the construction described it will be understood that the bait is placed in the two inclosures, and the mice or animals enter either inlet, being enticed by the bait, and pass from the compartment into the trapping-compartment, or the animals may enter the trapping-compartment directly through the entrance thereof, and when the mice or animals have been trapped it is simply necessary to detach the screen or open wire compartment and drown or otherwise destroy the mice or other animals.

It will thus be seen that I provide a trap which can be manufactured at a small price and which will operate to trap a large number of mice or animals, and thus prove useful, desirable, and practical.

I claim—

1. An animal-trap, composed of two sections or compartments hinged together, a lid on one compartment and means for locking the lid to secure the two compartments together.

2. An animal-trap consisting of two compartments hinged together, a lid or cover on one compartment, a fastening for securing the two compartments together, and entrances in both compartments provided with doors, and a communicating entrance between said compartments provided with a door.

3. An animal-trap consisting of two compartments, one forming the receiving-compartment and the other the trapping-compartment, bait-inclosures and entrances provided with doors in the receiving-compartment, an exit in the receiving-compartment, a sliding door for said compartment-exit, an entrance provided with a door in the trapping-compartment communicating with the exit of the receiving-compartment an inlet in the outer portion of the trapping-compartment provided with a door.

4. An animal-trap consisting of two sections or compartments, a lid or cover on one of the compartments, fastenings carried by the two compartments for securing the lid when closed, inlets in both compartments, pivoted doors for said inlets, bait-inclosures in one of the compartments, an exit in one compartment forming communication with the other compartment, and a door for controlling said exit.

In testimony whereof I affix my signature in presence of two witnesses.

SIMEON E. HUFFMAN.

Witnesses:
   WILLIAM W. FOWLER,
   GEO. WELLS SMITH.